(12) United States Patent
Zeng et al.

(10) Patent No.: US 12,719,123 B2
(45) Date of Patent: Aug. 25, 2026

(54) BATTERY, POWER CONSUMING APPARATUS, AND METHOD AND APPARATUS FOR MANUFACTURING BATTERY

(71) Applicant: CONTEMPORARY AMPEREX TECHNOLOGY (HONG KONG) LIMITED, Hong Kong (CN)

(72) Inventors: Zhimin Zeng, Ningde City (CN); YU Tang, Ningde City (CN); Haiqi Yang, Ningde City (CN); Peng Wang, Ningde City (CN); Xiaoteng Huang, Ningde City (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 570 days.

(21) Appl. No.: 18/358,031

(22) Filed: Jul. 25, 2023

(65) Prior Publication Data

US 2023/0369698 A1 Nov. 16, 2023

Related U.S. Application Data

(63) Continuation of application No. PCT/CN2021/109606, filed on Jul. 30, 2021.

(51) Int. Cl.
*H01M 50/24* (2021.01)
*H01M 10/04* (2006.01)
(Continued)

(52) U.S. Cl.
CPC ....... *H01M 50/24* (2021.01); *H01M 10/0404* (2013.01); *H01M 10/613* (2015.04);
(Continued)

(58) Field of Classification Search
CPC ............. H01M 50/24; H01M 10/0404; H01M 10/613; H01M 10/625; H01M 10/6556;
(Continued)

(56) References Cited

U.S. PATENT DOCUMENTS

2018/0212214 A1* 7/2018 Sakai .................. H01M 10/425
2020/0328399 A1 10/2020 Jiang et al.

FOREIGN PATENT DOCUMENTS

CN 208298881 U 12/2018
CN 112018303 A 12/2020
(Continued)

OTHER PUBLICATIONS

The First Office Action received in the counterpart CN application 202180073918.7, dated May 31, 2025, 13 pages with English translation.

(Continued)

*Primary Examiner* — Ula C Ruddock
*Assistant Examiner* — Sarika Gupta
(74) *Attorney, Agent, or Firm* — K&L Gates LLP

(57) ABSTRACT

Embodiments of the present application provide a battery, a power consuming apparatus, and a method and apparatus for manufacturing the battery. The battery comprises: a battery cell group comprising a plurality of battery cells; a cooling system provided on a first face of the battery cell group; a signal transmission assembly provided on a second face of the battery cell group that is adjacent to the first face and comprising a busbar component and an insulation layer, the insulation layer enclosing the busbar component, the insulation layer having holes, and the busbar component being configured to be electrically connected to the battery cells in the battery cell group at the holes; and a covering member for covering the signal transmission assembly to prevent
(Continued)

condensed liquid generated by the cooling system from reaching the signal transmission assembly.

16 Claims, 4 Drawing Sheets

(51) Int. Cl.
*H01M 10/613* (2014.01)
*H01M 10/625* (2014.01)
*H01M 10/6556* (2014.01)
*H01M 50/209* (2021.01)
*H01M 50/271* (2021.01)
*H01M 50/503* (2021.01)
*H01M 50/691* (2021.01)

(52) U.S. Cl.
CPC ..... *H01M 10/625* (2015.04); *H01M 10/6556* (2015.04); *H01M 50/209* (2021.01); *H01M 50/271* (2021.01); *H01M 50/503* (2021.01); *H01M 50/691* (2021.01)

(58) Field of Classification Search
CPC ............. H01M 50/209; H01M 50/271; H01M 50/503; H01M 50/691; H01M 10/6554; H01M 50/298; H01M 50/507; H01M 50/526; H01M 50/588; H01M 50/591; H01M 50/593; H01M 50/204; F28F 3/12; F28F 17/005; Y02E 60/10
See application file for complete search history.

(56) References Cited

FOREIGN PATENT DOCUMENTS

| | | | |
|---|---|---|---|
| CN | 212810495 | U | 3/2021 |
| CN | 113013503 | A | 6/2021 |
| DE | 102019127405 | A1 | 4/2021 |
| JP | 2013229182 | A | 11/2013 |
| JP | 2014093237 | A | 5/2014 |
| JP | 2014216248 | A | 11/2014 |
| JP | 2020523774 | A | 8/2020 |
| JP | 2021513199 | A | 5/2021 |
| JP | 2023511951 | A | 3/2023 |
| JP | 2023542478 | A | 10/2023 |
| WO | 2012133708 | A1 | 10/2012 |
| WO | 2013161654 | A1 | 10/2013 |
| WO | 2020194966 | A1 | 10/2020 |

OTHER PUBLICATIONS

The First Office Action received in the counterpart KR application 10-2023-7006240, dated May 13, 2025, 18 pages with English translation.
Decision to Grant a Patent received in the counterpart Japanese Application 2023-513820, mailed on Apr. 22, 2024.
International Search Report received in the corresponding International Application PCT/CN2021/109606, mailed Apr. 14, 2022.
Written Opinion received in the corresponding International Application PCT/CN2021/109606, mailed Apr. 14, 2022.
The extended European search report received in the counterpart European application 21951346.2, mailed on Sep. 18, 2024.
Notice of Allowance (with English Machine Translation), mailed Aug. 7, 2025, for corresponding Korean Patent Application Serial No. 10-2023-7006240.
Notice of Allowance (with English Machine Translation), mailed Jan. 12, 2026, for corresponding Chinese Patent Application Serial No. 202180073918.7.

* cited by examiner

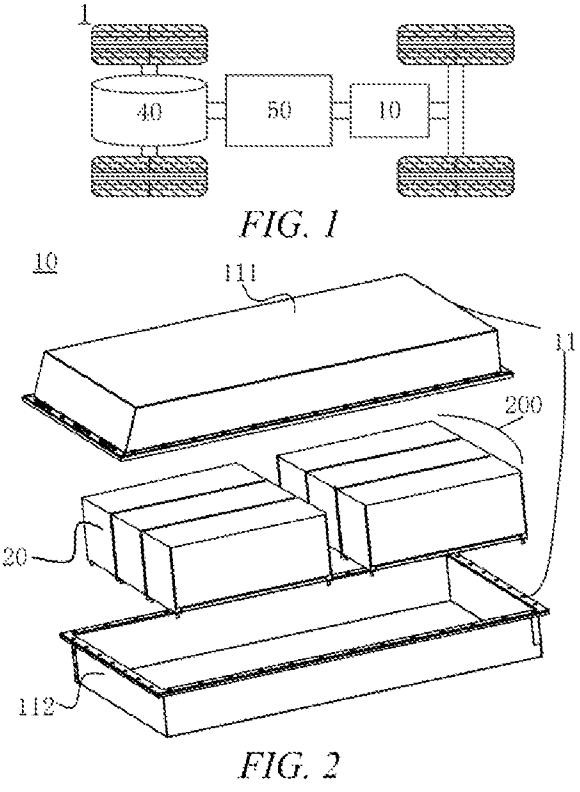
FIG. 1
FIG. 2
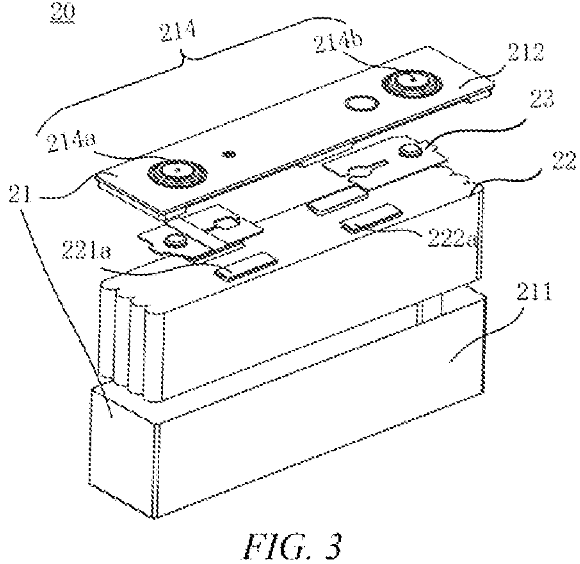
FIG. 3

BATTERY, POWER CONSUMING APPARATUS, AND METHOD AND APPARATUS FOR MANUFACTURING BATTERY

CROSS REFERENCE TO RELATED APPLICATIONS

The present application is a continuation of International Application PCT/CN2021/109606, filed on Jul. 30, 2021 and entitled "BATTERY, POWER CONSUMING APPARATUS, AND METHOD AND APPARATUS FOR MANUFACTURING BATTERY", the entire disclosure of which is incorporated herein by reference.

TECHNICAL FIELD

The present application relates to the technical field of batteries, and in particular to a battery, a power consuming apparatus, and a method and apparatus for manufacturing the battery.

BACKGROUND ART

With the increasing environmental pollution, the new energy industry has attracted increased attention. In the new energy industry, battery technology is a key factor in its development.

In the development of the battery technology, the problem of safety is not negligible. If the safety of batteries cannot be guaranteed, the batteries cannot be used.

When the battery is in a high-temperature and high-humidity environment, it is easy to generate condensed liquid in a case of the battery, which will cause a potential safety hazard to affect the safety of the battery. Therefore, how to enhance the safety of batteries is an urgent technical problem to be solved in the battery technology.

SUMMARY OF THE INVENTION

The present application provides a battery, a power consuming apparatus, and a method and apparatus for manufacturing the battery, which can enhance the battery safety.

In a first aspect, a battery is provided, comprising: a battery cell group comprising a plurality of battery cells; a cooling system provided on a first face of the battery cell group; a signal transmission assembly provided on a second face of the battery cell group, the second face being adjacent to the first face, the signal transmission assembly comprising a busbar component and an insulation layer, the insulation layer being used to enclose the busbar component, the insulation layer having holes, and the busbar component being configured to be electrically connected to the battery cells in the battery cell group at the holes; and a covering member for covering the signal transmission assembly to prevent condensed liquid generated by the cooling system from reaching the signal transmission assembly.

Therefore, the battery in the embodiment of the present application is provided with the cooling system on the first face, and is provided with the signal transmission assembly on the second face adjacent to the first face, so as to achieve electrical connection between the plurality of battery cells. In addition, the battery further comprises a covering member for covering the signal transmission assembly, so that when the cooling system generates condensed liquid, the covering member can prevent the condensed liquid from reaching the signal transmission assembly so as to prevent short-circuiting of the battery, thereby improving the safety of the battery.

Optionally, the first face may be the surface of the battery cell group having the largest area, so that when the cooling system is provided on the first face, the battery cell group has a larger area facing the cooling system, which can increase the heat dissipation rate of the battery cell group to achieve a better temperature regulation effect.

In some embodiments, the insulation layer extends toward the cooling system to a position close to the cooling system, and is turned over at the position in a direction away from the cooling system to form the covering member.

The covering member is formed by the insulation layer, so that there is no need to provide additional components, and the structure is relatively simple and is easy to process.

In some embodiments, a turnover portion of the insulation layer is fixedly connected to a third face of the battery cell group, the third face being parallel to the first face.

In some embodiments, an edge of the turnover portion of the insulation layer is provided with a folded edge region, the folded edge region being configured to be fixedly connected to the third face, which can further achieve the fixing between the turnover portion of the insulation layer and the battery cell group, that is, the fixing between the covering member and the battery cell group.

Optionally, the folded edge region may be fixedly connected to the third face by means of a binder, etc.

In some embodiments, the insulation layer and the second face form, at the turnover position, an angle region facing the cooling system, the angle region being configured to collect a binder for bonding the cooling system.

When the cooling system is fixed to the first face by means of bonding with a binder, the angle region can serve as a binder overflow region to collect excess binder that overflows, so as to prevent the binder from affecting the other components in the battery.

In some embodiments, the covering member is a cover plate that covers the second face.

The signal transmission assembly of the battery cell group can be covered by the cover plate to prevent the condensed liquid from entering the signal transmission assembly, so that the structure is simple and is easy to process.

In some embodiments, the cover plate comprises a first connecting region configured to be fixedly connected to the first face.

In some embodiments, the cover plate further comprises a second connecting region configured to be fixedly connected to the third face of the battery cell group, the third face being parallel to the first face.

When the cover plate is mounted and fixed, the first connecting region and/or the second connecting region can be used for fixing. For example, the first connecting region is fixed to the first face by the binder, the second connecting region is fixed to the third face by the binder, and then the cooling system is fixed to the first face by, for example, the binder, so as to achieving the fixing between the cover plate and the battery cell group and between the cooling system and the battery cell group.

In some embodiments, the cover plate is provided with drain grooves for draining the condensed liquid. For example, the condensed liquid can be discharged to a position away from the signal transmission assembly through the drain groove, for example, the condensed liquid can be discharged to the bottom of the case or discharged out of the case.

In some embodiments, the cover plate is further provided with a confluence groove that is in communication with the drain groove, the confluence groove being used to collect the condensed liquid and introduce the condensed liquid into the drain groove.

Specifically, the confluence groove can be provided at a position close to the cooling system to facilitate collection of the condensed liquid, and the condensed liquid flows to the drain groove through the confluence groove and is then discharged to a position where it does not affect the signal transmission assembly.

In some embodiments, the cover plate is made of an insulation material.

Optionally, the material of the cover plate may be the same as or different from the material of the insulation layer in the signal transmission assembly.

In some embodiments, the battery cell group comprises N battery cell rows arranged in a first direction, and the battery cells in each battery cell row in the N battery cell rows are arranged in a second direction, the first direction being perpendicular to the second direction, and N being a positive integer; and wherein the first face is perpendicular to the first direction, and the second face is parallel to a plane determined by the first direction and the second direction.

In some embodiments, the projection of the cooling system in the first direction covers the projection of the covering member, and the first face is perpendicular to the first direction.

In this way, the cooling system can cover the covering member, the covering member does not affect the installation of the cooling system, and the condensed liquid generated by the cooling system can be better kept out by the covering member.

In some embodiments, the end of the cooling system close to the covering member is provided obliquely toward the covering member. In this way, the condensed liquid generated on the surface of the cooling system can slide down through the inclined portion, which can prevent the condensed liquid from accumulating on the surface of the cooling system and not being discharged, thereby further improving the safety of the battery.

In a second aspect, a power consuming apparatus is provided, comprising: a battery in the first aspect for supplying electric energy.

In some embodiments, the power consuming apparatus is a vehicle, a ship or a spacecraft.

In a third aspect, a method for manufacturing a battery is provided, the method comprising: providing a battery cell group that comprises a plurality of battery cells; providing a cooling system that is provided on a first face of the battery cell group; providing a signal transmission assembly that is provided on a second face of the battery cell group, the second face being adjacent to the first face, the signal transmission assembly comprising a busbar component and an insulation layer, the insulation layer being used to enclose the busbar component, the insulation layer having holes, and the busbar component being configured to be electrically connected to the battery cells in the battery cell group at the holes; and providing a covering member that is used to cover the signal transmission assembly to prevent condensed liquid generated by the cooling system from reaching the signal transmission assembly.

In a fourth aspect, an apparatus for manufacturing a battery is provided, the apparatus comprising a module for performing a method according to the third aspect.

According to the technical solutions of the embodiments of the present application, the battery cell group included in the battery is provided with the cooling system on the first face, and is provided with the signal transmission assembly on the second face adjacent to the first face, so as to achieve electrical connection between the plurality of battery cells. In addition, the battery further comprises a covering member for covering the signal transmission assembly, so that when the cooling system generates condensed liquid, the covering member can prevent the condensed liquid from reaching the signal transmission assembly so as to prevent short-circuiting of the battery, thereby improving the safety of the battery.

BRIEF DESCRIPTION OF THE DRAWINGS

FIG. 1 is a schematic structural diagram of a vehicle disclosed in an embodiment of the present application;

FIG. 2 is a schematic exploded structural diagram of a battery disclosed in an embodiment of the present application;

FIG. 3 is a schematic exploded structural diagram of a battery cell disclosed in an embodiment of the present application;

Figures 4, 5:
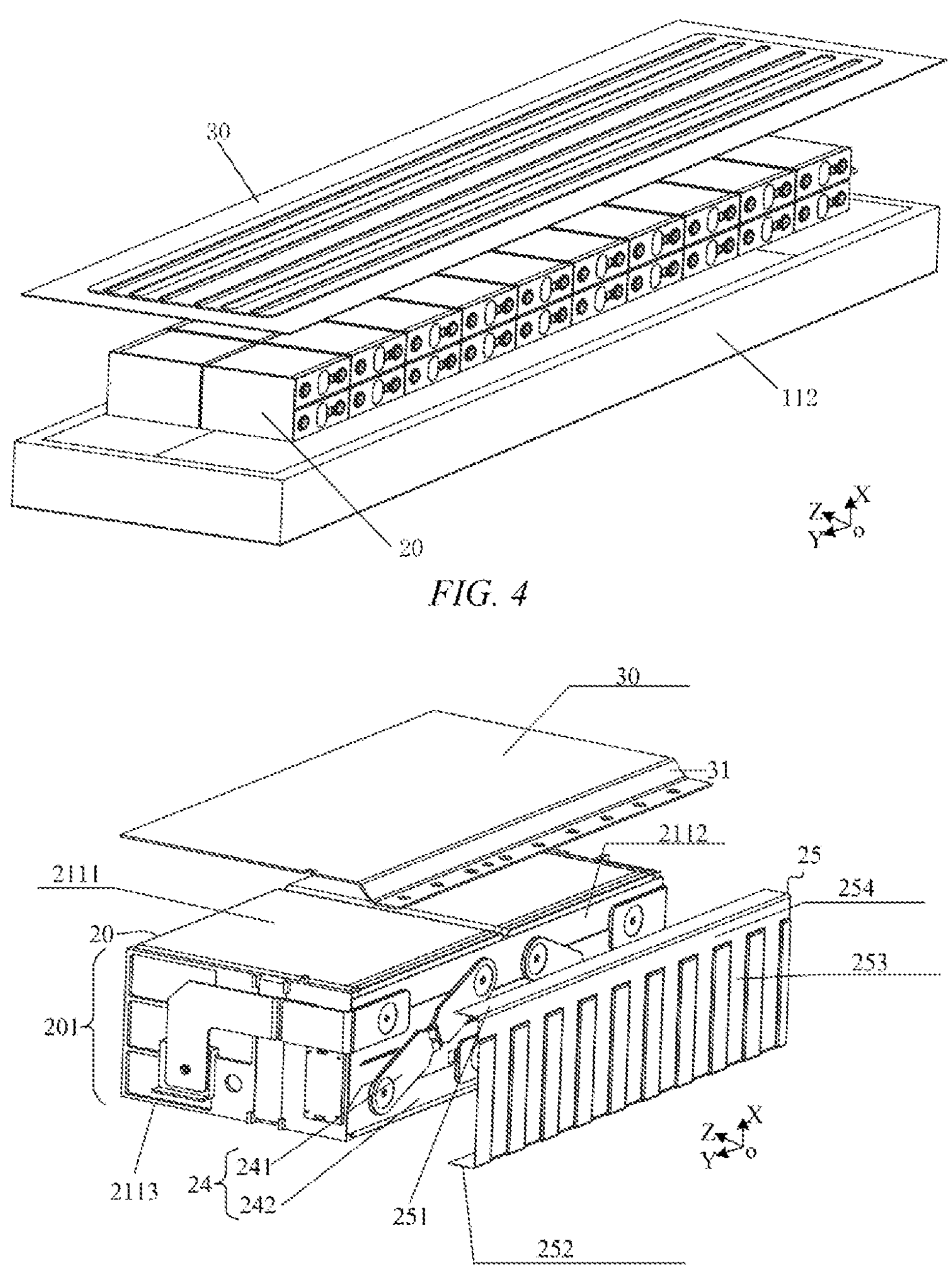
FIG. 4 is a schematic exploded structural diagram of another battery disclosed in an embodiment of the present application.
FIG. 5 is a schematic exploded diagram of some components inside a battery disclosed in an embodiment of the present application.

In the drawings, the figures are not drawn to actual scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example, but should not be used to limit the scope of the present application, that is, the present application is not limited to the described embodiments.

In the description of the present application, it should be noted that "a plurality of" means at least two, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance.

The term "perpendicular" does not mean being perpendicular in the strict sense, but within an allowable range of errors. The term "parallel" does not mean being parallel in the strict sense, but within an allowable range of errors.

In the present application, "embodiment" mentioned means that the specific features, structures and characteristics described in conjunction with the embodiments may be included in at least one embodiment of the present application. The phrase at various locations in the specification does not necessarily refer to the same embodiment, or an independent or alternative embodiment exclusive of another embodiment. Those skilled in the art should understand explicitly or implicitly that an embodiment described in the present application can be combined with another embodiment.

The orientation terms in the following description all indicate directions shown in the drawings, but do not limit the specific structure in the present application. In the description of the present application, it should also be noted that the terms "mounting", "connecting" and "connection" should be interpreted in a broad sense, unless explicitly specified and defined otherwise, which, for example, may be a fixed connection, a detachable connection or an integral connection, or may mean a direct connection, or an indirect connection by means of an intermediate medium. For those of ordinary skill in the art, the specific meaning of the terms mentioned above in the present application can be construed according to specific circumstances.

The term "and/or" in the present application is merely a description of the associated relationship of associated objects, representing that three relationships may exist, for example, A and/or B, may be expressed as: the three instances of A alone, both A and B, and B alone. In addition, the character "/" in the present application generally indicates that the associated objects before and after the character are in a relationship of "or".

In the present application, a battery cell may include a lithium ion secondary battery, a lithium ion primary battery, a lithium-sulfur battery, a sodium/lithium ion battery, a sodium ion battery or a magnesium ion battery, etc., which is not limited in the embodiments of the present application. The battery cell may be cylindrical, flat, cuboid or in another shape, which is not limited in the embodiments of the present application. The battery cells are generally classified into three types depending on the way of package: cylindrical battery cells, prismatic battery cells and pouch battery cells, which are also not limited in the embodiments of the present application.

A battery mentioned in the embodiments of the present application refers to a single physical module comprising one or more battery cells to provide a higher voltage and capacity. For example, the battery mentioned in the present application may comprise a battery pack, etc. The battery generally comprises a case for enclosing one or more battery cells. The case can prevent liquid or other foreign matters from affecting the charging or discharging of the battery cell.

The battery cell comprises an electrode assembly and an electrolytic solution, the electrode assembly composing a positive electrode plate, a negative electrode plate and a separator. The battery cells operate mainly by means of metal ions moving between the positive electrode plate and the negative electrode plate. The positive electrode plate comprises a positive electrode current collector and a positive electrode active material layer, the positive electrode active material layer being covered on a surface of the positive electrode current collector, with the current collector not covered with the positive electrode active material layer protruding from the current collector covered with the positive electrode active material layer, and the current collector not covered with the positive electrode active material layer serving as a positive electrode tab. Taking a lithium ion battery as an example, the positive electrode current collector may be made of aluminum, and a positive electrode active material may be lithium cobalt oxide, lithium iron phosphate, ternary lithium, lithium manganate, etc. The negative electrode plate comprises a negative electrode current collector and a negative electrode active material layer, the negative electrode active material layer being covered on a surface of the negative electrode current collector, the current collector not covered with the negative electrode active material layer protruding from the current collector covered with the negative electrode active material layer, and the current collector not covered with the negative electrode active material layer serving as a negative electrode tab. The negative electrode current collector may be made of copper, and a negative electrode active material may be carbon, silicon, etc. In order to ensure that no fusing occurs when a large current passes, a plurality of positive electrode tabs are provided and are stacked together, and a plurality of negative electrode tabs are provided and are stacked together. The separator may be made of polypropylene (PP), polyethylene (PE), etc. In addition, the electrode assembly may be of a wound structure or a laminated structure, which is not limited in the embodiments of the present application.

The battery may comprise a plurality of battery cells in order to meet different power demands, with the plurality of battery cells being in series connection, parallel connection or series-parallel connection. The series-parallel connection refers to a combination of series connection and parallel connection. Optionally, the plurality of battery cells may be in series connection or in parallel connection or in series-parallel connection to constitute a battery module, and then a plurality of battery modules may in series connection or in parallel connection or in series-parallel connection to constitute the battery. That is to say, the plurality of battery cells may directly form a battery, or may form battery modules that may then form a battery. The battery is further provided in a power consuming apparatus to supply electric energy to the power consuming apparatus.

The development of battery technology needs to consider many design factors at the same time, such as energy density, cycle life, discharge capacity, charge-discharge rate, and other performance parameters, and also needs to consider the safety of the battery.

For battery cells, the main safety hazard comes from the charging and discharging process, and thus a proper temperature design is also provided. In order to control the battery cells to be at a proper temperature, a cooling system may be provided in the battery. The cooling system is used to accommodate a cooling medium to cool the battery cells. The cooling system may also be referred to as a cooling component, a cooling plate, etc., and the cooling medium may also be referred to as a cooling fluid, and more specifically, may be referred to as a cooling liquid or a cooling gas. The cooling fluid circulates to achieve a better temperature regulation effect. Optionally, the cooling medium may be water, a mixture of water and ethylene glycol, air, etc. If the cooling medium is water, the cooling system may also be referred to as a water cooling plate.

In the case of the battery, in addition to the battery cells and the cooling system mentioned above, a signal transmission assembly and other components of the battery may also be included. In some embodiments, a structure for fixing the battery cells may further be provided in the case. The case may be shaped depending on the plurality of battery cells accommodated. In some embodiments, the case may be square with six walls.

It should be understood that the signal transmission assembly in the embodiment of the present application can be used for transmission of signals of voltage and/or temperature, etc. of battery cells. The signal transmission assembly may comprise a busbar component that is used to achieve electrical connection, such as parallel connection or series connection or series-parallel connection, between the plurality of battery cells. The busbar component may achieve the electrical connection between the battery cells by means of connecting electrode terminals of the battery cells. In some embodiments, the busbar component may be fixed to the electrode terminals of the battery cells by means of welding. The busbar component transmits the voltage of the battery cells, a higher voltage will be obtained after the plurality of battery cells are connected in series, and accordingly, the electrical connection formed by the busbar component may also be referred to as "high-voltage connection".

In addition to the busbar component, the signal transmission assembly may further comprise a sensing device for sensing the state of the battery cells, for example, the sensing device may be used for the measurement and transmission of sensing signals such as the temperature and the state of charge of the battery cells. In the embodiments of the present application, the electrical connection components in the battery may include the busbar component and/or the sensing device.

The busbar component and the sensing device may be enclosed in an insulation layer to form the signal transmission assembly. Accordingly, the signal transmission assembly may be used for transmission of the voltage and/or sensing signals of the battery cells. The signal transmission assembly has no insulation layer at the connections with the electrode terminals of the battery cells, that is, the insulation layer has holes at the connections and is thus connected to the electrode terminals of the battery cells.

It is considered that when the battery is in a high-temperature and high-humidity environment, it is easy to generate condensed liquid in the case of the battery, causing a safety hazard to the signal transmission assembly in the battery, which may lead to an electrical connection fault and the failure of the signal transmission assembly and thus affect the safety of the battery. Specifically, when the high-temperature and high-humidity gas in the battery meets the cooling system in the case of the battery, condensed liquid may be generated and may affect the safety of the battery if it drips to electrical connection regions in the battery.

In view of this, the present application provides a technical solution, in which the signal transmission assembly that achieves the electrical connection of the battery is externally provided with a covering member to cover the signal transmission assembly so as to prevent the condensed liquid generated by the cooling system from reaching the electrical connection region, which can prevent the condensed liquid from affecting the electrical connection region in the battery and does not affect the signal transmission assembly, thus enhancing the safety of the battery.

In the battery, in addition to the components mentioned above, a pressure balancing mechanism may be provided on the case of the battery for balancing the pressure inside and outside the case. For example, when the pressure inside the case is higher than outside the case, the gas inside the case can flow out of the case by means of the pressure balancing mechanism; and when the pressure inside the case is lower than outside the case, the gas outside the case can flow into the case by means of the pressure balancing mechanism.

It should be understood that the components in the battery case described above should not be construed as a limitation on the embodiments of the present application, that is to say, the case for the battery of the embodiments of the present application may or may not comprise the components described above.

The technical solutions described in the embodiments of the present application are all applicable to various devices using a battery, such as mobile phones, portable apparatuses, laptops, battery cars, electric toys, electric tools, electric vehicles, ships and spacecraft. For example, the spacecrafts include airplanes, rockets, space shuttles, space vehicles, etc.

It should be understood that the technical solutions described in the embodiments of the present application are not only applicable to the devices described above, but also applicable to all apparatuses using a battery. However, for the sake of brevity of description, the following embodiments will be described taking an electric vehicle as an example.

For example, FIG. 1 shows a schematic structural diagram of a vehicle 1 according to an embodiment of the present application. The vehicle 1 may be a fuel vehicle, a gas vehicle or a new-energy vehicle. The new-energy vehicle may be a battery electric vehicle, a hybrid vehicle, an extended-range vehicle, etc. The interior of the vehicle 1 may be provided with a motor 40, a controller 50 and a battery 10. The controller 50 is used to control the battery 10 to supply power to the motor 40. For example, the battery 10 may be provided at the bottom or the head or the tail of the vehicle 1. The battery 10 may be used to supply power to the vehicle 1. For example, the battery 10 can serve as a power source for operating the vehicle 1 for use in a circuit system of the vehicle 1, for example, to meet the working power demand of the vehicle 1 during startup, navigation and running. In another embodiment of the present application, the battery 10 can not only serve as a power source for operating the vehicle 1, but also serve as a power source for driving the vehicle 1, instead of or partially instead of fuel or natural gas, to provide driving power for the vehicle 1.

The battery 10 may comprise a plurality of battery cells in order to meet different power demands. For example, FIG. 2 shows a schematic structural diagram of a battery 10 according to an embodiment of the present application. The battery 10 may comprise at least one battery module 200. The battery module 200 comprises a plurality of battery cells 20. The battery 10 may further comprise a case 11. The case 11 has a hollow structure inside, and the plurality of battery cells 10 are accommodated in the case 11. As shown in FIG. 2, the case 11 may comprise two portions, respectively referred to herein as a first portion 111 (an upper case) and a second portion 112 (a lower case). The first portion 111 and the second portion 112 are snap-fitted together. The first portion 111 and the second portion 112 may be shaped depending on the shape of a combination of the plurality of battery cells 20, and at least one of the first portion 111 and the second portion 112 has an opening. For example, as shown in FIG. 2, the first portion 111 and the second portion 112 may both be a hollow cuboid and each have only one open face, an opening of the first portion 111 and an opening of the second portion 112 are disposed opposite to each other, and the first portion 111 and the second portion 112 are snap-fitted to each other to form the case 11 having an enclosed chamber. For another example, different from what is shown in FIG. 2, only one of the first portion 111 and the second portion 112 may be a hollow cuboid having an opening, and the other may be plate-shaped to cover the opening. For example, taking an example here in which the second portion 112 is a hollow cuboid and has only one open face, while the first portion 111 is plate-shaped, the first portion 111 covers the opening of the second portion 112 to form a case having an enclosed chamber that can be used to accommodate the plurality of battery cells 20. The plurality of battery cells 20 are combined in parallel connection or in series connection or in series-parallel connection, and then placed in the case 11 that is formed after the first portion 111 and the second portion 112 are snap-fitted together.

Optionally, the battery 10 may further comprise other structures, which will not be described in detail herein. For example, the battery 10 may further comprise a busbar component that are used to achieve electrical connection, such as parallel connection or series connection or series-parallel connection, between the plurality of battery cells 20. Specifically, the busbar component may achieve the electrical connection between the battery cells 20 by means of connecting electrode terminals of the battery cells 20. Further, the busbar component may be fixed to the electrode terminals of the battery cells 20 by means of welding. The electric energy of the plurality of battery cells 20 may be further extracted by means of an electrically conductive mechanism passing through the case. Optionally, the electrically conductive mechanism may also be a busbar component.

The number of the battery cells 20 may be set as any value depending on different power demands. The plurality of battery cells 20 may be in series connection, in parallel connection or in series-parallel connection to achieve higher capacity or power. Since each battery 10 may comprise a large number of the battery cells 20. For ease of mounting, the battery cells 20 may be provided in groups, and each group of battery cells 20 forms a battery module. The number of the battery cells 20 included in the battery module is not limited and may be set as required. The battery may comprise a plurality of battery modules that may be in series connection, in parallel connection or in series-parallel connection.

FIG. 3 shows a schematic structural diagram of a battery cell 20 according to an embodiment of the present application. The battery cell 20 comprises one or more electrode assemblies 22, a housing 211, and an end cap 212. The housing 211 and the end cap 212 form a shell or a battery box 21. Walls of the housing 211 and the end cap 212 are both referred to as walls of the battery cell 20. For a cuboid battery cell 20, the walls of the housing 211 include a bottom wall and four side walls. The housing 211 may be determined depending on the shape of a combination of the one or more electrode assemblies 22, for example, the housing 211 may be a hollow cuboid, cube or cylinder, with one of the faces of the housing 211 having an opening such that the one or more electrode assemblies 22 can be disposed in the housing 211. For example, when the housing 211 is a hollow cuboid or cube, one of the flat faces of the housing 211 is an open face, that is, this flat face has no wall such that the inside of the housing 211 is in communication with the outside. When the housing 211 may be a hollow cylinder, an end face of the housing 211 is an open face, that is, this end face has no wall such that the inside of the housing 211 is in communication with the outside. The end cap 212 covers the opening and is connected to the housing 211 to form an enclosed chamber in which the electrode assemblies 22 are disposed. The housing 211 is filled with an electrolyte, such as an electrolytic solution.

The battery cell 20 may further comprise two electrode terminals 214. The two electrode terminals 214 may be provided on the end cap 212. The end cap 212 is generally in the form of a flat plate, the two electrode terminals 214 are fixed to a flat plate face of the end cap 212, and the two electrode terminals 214 are respectively a positive electrode terminal **214*a* and a negative electrode terminal 214*b*. Each electrode terminal 214 is correspondingly provided with a connecting member 23, or referred to as a current collecting member 23, that is located between the end cap 212 and the electrode assembly 22 to achieve the electrical connection between the electrode assembly 22 and the electrode terminal 214**.

As shown in FIG. 3, each electrode assembly 22 has a first tab **221*a* and a second tab 222*a*. The first tab 221*a* and the second tab 222*a* have opposite polarities. For example, when the first tab 221*a* is a positive electrode tab, the second tab 222*a* is a negative electrode tab. The first tab 221*a* of the one or more electrode assemblies 22 is connected to an electrode terminal by means of a connecting member 23, and the second tab 222*a* of the one or more electrode assemblies 22 is connected to the other electrode terminal by means of the other connecting member 23. For example, the positive electrode terminal 214*a* is connected to the positive electrode tab by means of a connecting member 23, and the negative electrode terminal 214*b* is connected to the negative electrode tab by means of another connecting member 23**.

In the battery cell 20, according to the demands in actual use, one or more electrode assemblies 22 may be provided. As shown in FIG. 3, four independent electrode assemblies 22 are provided in the battery cell 20.

A pressure relief mechanism may also be provided on the battery cell 20. The pressure relief mechanism is used to actuate, when the internal pressure or temperature of the battery cell 20 reaches a threshold, to relieve the internal pressure or temperature.

The pressure relief mechanism may be of a variety of possible pressure relief structures, which are not limited in the embodiments of the present application. For example, the pressure relief mechanism may be a temperature-sensitive pressure relief mechanism that is configured to melt when the internal temperature of the battery cell 20 provided with the pressure relief mechanism reaches a threshold; and/or the pressure relief mechanism may be a pressure-sensitive pressure relief mechanism that is configured to fracture when the internal gas pressure of the battery cell 20 provided with the pressure relief mechanism reaches a threshold.

It should be understood that the plurality of battery cells 20 included in the battery 10 in the embodiment of the present application may be arranged and placed in the case 11 in any direction. For example, taking the battery cells 20 in the shape of a cuboid as shown in FIG. 3 as an example, as shown in FIG. 2, the plurality of battery cells 20 can be mounted in the case in a vertical direction as shown in FIG. 3, so that after being mounted, the end caps 212 of the plurality of battery cells 20 face the upper case 111, and the bottom walls of the housings 211 of the battery cells 20 face the lower case 112. For another example, different from FIG. 2, a plurality of battery cells 20 as shown in FIG. 3 may also be laterally disposed in the case.

Specifically, FIG. 4 shows another schematic exploded diagram of a battery 10 according to an embodiment of the present application. As shown in FIG. 4, a plurality of battery cells 20 may be laterally disposed in the case. As shown in FIG. 4, the battery 10 may comprise a plurality of battery cells 20. The plurality of battery cells 20 may be arranged in multiple layers, for example, taking two layers of battery cells 20 as an example shown in FIG. 4. For the uppermost layer of battery cells 20 in the battery 10, the side wall with the largest area among the side walls of the battery cells 20 in the uppermost layer faces the opening of the lower case 112, that is, faces the upper case 111 (not shown in FIG. 4); and on the contrary, for the lowermost layer of battery cells 20 in the battery 10, the side wall with the largest area among the side walls of the battery cells 20 in the lowermost layer faces the bottom wall of the lower case 112, that is, faces the wall of the lower case 112 opposite the opening. That is to say, as shown in FIGS. 3 and 4, one end of the end caps 212 of the plurality of battery cells 20 faces the side wall of the lower case 112, that is, faces the wall of the lower case 112 adjacent to the opening. In this way, compared with the mounting method of the battery cells 20 shown in FIG. 2, the mounting method shown in FIG. 4 is more conducive to the heat dissipation of the battery cells 20.

In order to further control that the battery cells 10 can work at a suitable temperature, a cooling system 30 may also be provided in the battery 10 to ensure the temperature of the battery 10. Specifically, as shown in FIG. 4, the cooling system 30 may be provided above the plurality of battery cells 20, so that the side walls of the battery cells 20 with a large area face the cooling system 30, so as to increase the heat dissipation area of the battery cells 20, which is more conducive to the heat dissipation of the battery cells 20.

Optionally, an upper case 111 may be provided above the cooling system 30, so that the upper case 111 and the lower case 112 are snap-fitted together, thereby forming the case of the battery 10; or the cooling component 30 may be integrated into the upper case 111 to reduce the space occupied, that is, the cooling system 30 can serve as the upper case 111 that is snap-fitted with the lower case 112 to form the case 11 of the battery 10.

When the battery 10 is in a high-temperature and high-humidity environment, it is easy to generate condensed liquid in the case, especially on the surface of and around the cooling system 30, and thus for the mounting method of the battery cells as shown in FIG. 4, when the condensed liquid generated by the cooling system 30 drips, it is likely to cause a safety hazard to the electrical connection regions in the battery 10 to affect the safety of the battery 10. Specifically, when the high-temperature and high-humidity gas in the case 11 of the battery 10 meets the cooling system 30 in the battery 10, condensed liquid may be generated and may affect the safety of the battery 10 if it drips to the electrical connection regions in the battery 10.

Therefore, an embodiment of the present application provides a battery 10, which can solve the problem mentioned above.

Specifically, FIG. 5 shows a partial schematic exploded diagram of a battery 10 in the embodiment of the present application. as shown in FIG. 5, the battery 10 in the embodiment of the present application may comprise battery cell groups 201, and for any one of the battery cell groups 201, the battery cell group 201 may comprise a plurality of battery cells 20. For example, in FIG. 5, taking one battery cell group 201 as an example, the battery cell group 201 may comprise four battery cells 20.

Specifically, for any one battery cell group 201, the plurality of battery cells 20 can be arranged in various ways. For example, as shown in FIG. 5, the battery cell group 201 may comprise N battery cell rows, N being a positive integer. The N battery cell rows are arranged in a first direction X, for example, N=2 in FIG. 5; and the battery cells 20 in each of the N battery cell rows can be arranged in a second direction Y, the first direction X being perpendicular to the second direction Y.

As shown in FIG. 5, the battery 10 further comprises a cooling system 30. The cooling system 30 is provided on the first face 2111 of the battery cell group 201. It should be understood that the first face 2111 may refer to any surface of the battery cell group 201 according to the different directions in which the plurality of battery cells 20 are provided in the case 11 of the battery 10. For example, taking each battery cell 20 being a cuboid as an example, in order to increase the heat dissipation capacity of the battery cell 20, the cooling system 30 can be provided above the side wall with the largest area as shown in FIG. 5, then the face of the battery cell group 201 facing the cooling system 30 is the first face 2111, and the first face 2111 is the face of the battery cell group 201 having the largest area. For example, as shown in FIG. 5, the first face 2111 is perpendicular to the first direction X, which can increase the heat dissipation rate of the battery cell group 201 to achieve a better temperature regulation effect.

As shown in FIG. 5, the battery 10 may further comprise a signal transmission assembly 24 that is provided on a second face 2112 of the battery cell group 201, the second face 2112 being adjacent to the first face 2111. Specifically, the signal transmission assembly 24 may be used to achieve the transmission of voltage and/or temperature signals of the battery cells 20. For example, the signal transmission assembly 24 may comprise a busbar component 241 and an insulation layer 242, the insulation layer 242 being used to enclose the busbar component 241, the insulation layer 242 having holes (not shown), and the busbar component 241 being configured to be electrically connected to the battery cells 20 in the battery cell group 201 at the holes.

Optionally, the insulation layer 242 in the embodiment of the present application can enclose the busbar component 241 by means of hot pressing, and by means of providing the holes, the electrical connection between the battery cells 20 in the battery cell group 201 at the holes can be achieved by means of the busbar component 241.

In the embodiment of the present application, the signal transmission assembly 24 of the embodiment of the present application can be used to achieve various forms of electrical connection between the battery cells 20. For example, the electrical connection regions in the battery 10 may include regions provided with the busbar component 241. In addition, a sensing device for sensing the state of the battery cells 20 may also be provided in the battery 10, and the electrical connection regions in the battery 10 may also include electrical connection regions provided with the sensing device. Optionally, the signal transmission assembly 24 in the embodiment of the present application may comprise a sensing device, and the insulation layer 242 may also be used to enclose the sensing device.

Considering the arrangement of the battery cells 20 and the cooling system 30 as shown in FIG. 5, when the battery 10 is in a high-temperature and high-humidity environment, it is easy to generate condensed liquid in the case of the battery 10, especially the condensation generated on the cooling system 30 may drip onto the electrical connection regions in the battery 10, for example, may drip onto the busbar component 241, which may cause short-circuiting and failure of the battery 10 and thus affect the safety of the battery 10. Therefore, as shown in FIG. 5, the battery 10 may further comprise a covering member 25. The covering member 25 is used to cover the signal transmission assembly 24 to prevent condensed liquid generated by the cooling system 30 from reaching the signal transmission assembly 24.

Therefore, the battery 10 in the embodiment of the present application is provided with the cooling system 30 on the first face 2111, and is provided with the signal transmission assembly 24 on the second face 2112 adjacent to the first face 2111, so as to achieve electrical connection between the plurality of battery cells 20. In addition, the battery 10 further comprises a covering member 25 for covering the signal transmission assembly 24, so that when the cooling system 30 generates condensed liquid, the covering member 25 can prevent the condensed liquid from reaching the signal transmission assembly 24 so as to prevent short-circuiting of the battery 10, thereby improving the safety of the battery 10.

It should be understood that the covering member 25 in the embodiment of the present application may be provided in various ways, which will be described in detail below in conjunction with the accompanying drawings.

Optionally, as an embodiment, the covering member 25 may be a cover plate that can cover the second face 2112 where the signal transmission assembly 24 is located. Specifically, as shown in FIG. 5, the battery 10 may be provided with a cover plate 25 that can cover the second face 2112 to serve as the covering member 25. Optionally, the cover plate 25 may be made of any insulation material. For example, the cover plate 25 may be made of an insulation material the same as or different from the insulation layer 242, which will not be limited in the embodiments of the present application.

Optionally, the cover plate 25 may be fixed to the battery cell group 201 in various ways. For example, as shown in FIG. 5, the cover plate 25 may comprise a first connecting region 251 for fixed connection to the first face 2111. Further, the cover plate 25 may further comprise a second connecting region 252 for fixed connection to the third face 2113 of the battery cell group 201, the third face 2113 being parallel to the first face 2111, and the third face 2113 being adjacent to the second face 2112. The first connecting region 251 and/or the second connecting region 252 may be formed by bending two ends of the cover plate 25 in the first direction X. Specifically, when the cover plate 25 is mounted, the cover plate 25 can be fixed to the second face 2112 where the signal transmission assembly 24 is located by means of the first connecting region 251 and/or the second connecting region 252. For example, the first connecting region 251 and/or the second connecting region 252 may be respectively fixed to the corresponding first face 2111 and/or third face 2113 by means of a binder such as double-sided tape, and then the cooling system 30 is fixed to the first face 2111 by means of a binder, etc., so as to achieve the fixing between the cover plate 25 and the battery cell group 201 and between the cooling system 30 and the battery cell group 201, which is not limited in the embodiments of the present application.

It should be understood that, as shown in FIG. 5, the cover plate 25 in the embodiment of the present application may also be provided with a drain groove 253 for draining the condensed liquid. For example, the condensed liquid can be discharged to a position away from the signal transmission assembly 24 through the drain groove 253, for example, the condensed liquid can be discharged to the bottom of the case 11 or discharged out of the case 11.

Optionally, as shown in FIG. 5, the cover plate 25 may further be provided with a confluence groove 254, the confluence groove 254 being in communication with the drain groove 253, and the confluence groove 254 being used to collect the condensed liquid and introduce the condensed liquid into the drain groove 253. Specifically, the confluence groove 254 may be closer to the cooling system 30 than the drain groove 253 to facilitate collection of the condensed liquid; and the collected condensed liquid is discharged to other positions through the drain groove 253 to prevent the condensed liquid from affecting the signal transmission assembly 24.

Figure 6:
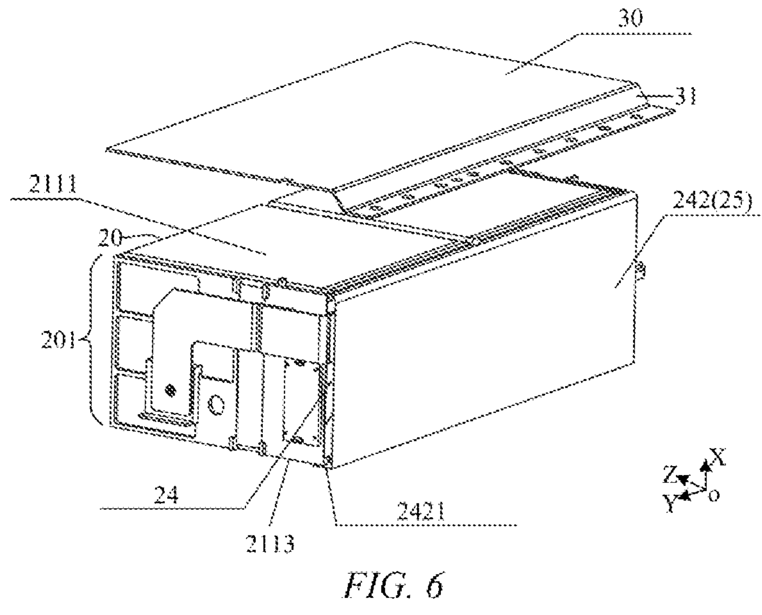
FIG. 6 is a schematic exploded diagram of some components inside another battery disclosed in an embodiment of the present application.
Figure 7:
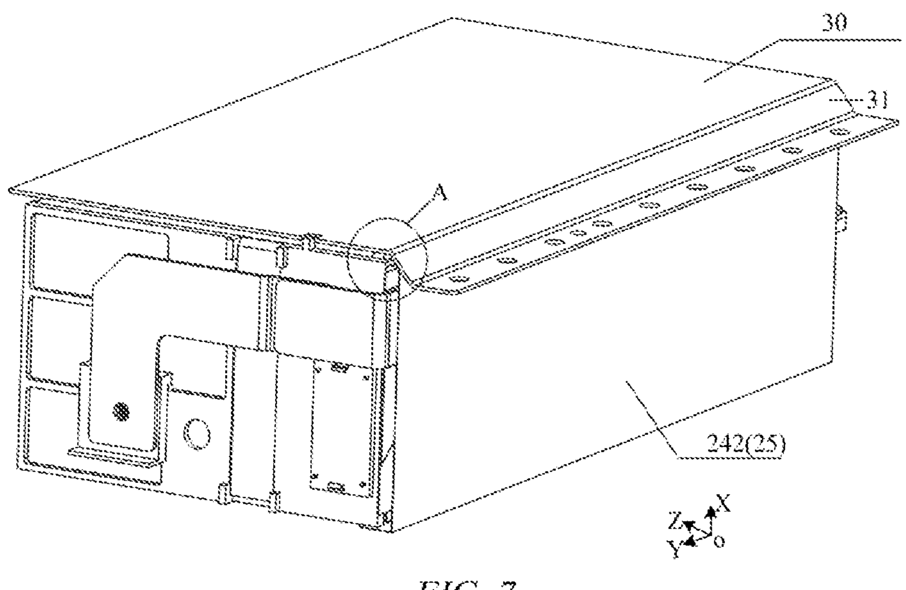
FIG. 7 is a schematic diagram of some components inside a battery disclosed in an embodiment of the present application after mounted.
Figure 8:
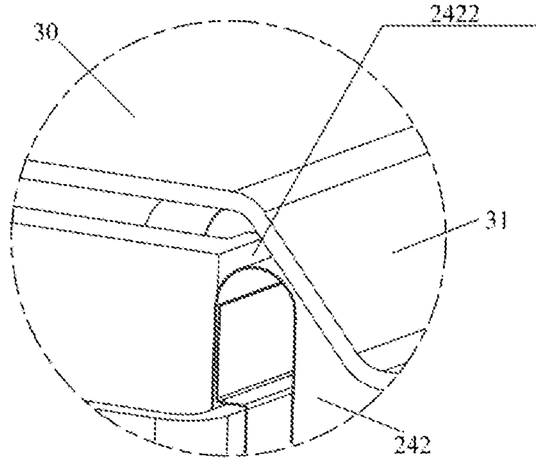
FIG. 8 is a partial enlarged view of region A in FIG. 7.

Optionally, as another embodiment, the covering member 25 in the embodiment of the present application may also be part of the insulation layer 242. Specifically, FIG. 6 shows another schematic exploded diagram of some components of a battery 10 according to an embodiment of the present application, FIG. 7 is a schematic diagram of the components in FIG. 6 after mounted, and FIG. 8 is a partial enlarged view of region A in FIG. 7. As shown in FIGS. 6 to 8, the covering member 25 in the embodiment of the present application may also be formed by turning over the insulation layer 242. In this way, the covering member 25 can be directly formed by the insulation layer 242, so that the structure is simplified and is easy to process.

As shown in FIGS. 6 to 8, the insulation layer 242 extends toward the cooling system 30 to a position close to the cooling system 30, and is turned back at this position, that is, turned over at this position in a direction away from the cooling system 30, to form the covering member 25 so as to cover the second face 2112. Specifically, when the signal transmission assembly 24 is processed, the insulation layer 242 can be provided with a reserved portion that can be turned over and cover the second face 2112, and then when the insulation layer 242 and the busbar component 241 are processed to form the signal transmission assembly 24 by means of hot-pressing, a part of the insulation layer 242 encloses the busbar component 214 and is fixed to the end cap 212 of the battery cell 20, and the reserved portion of the insulation layer 242 can be turned over to form the covering member 25 that covers the second face 2112, so as to achieve the effect of isolating the condensed liquid. The structure does not require additional components, has simple processing process, and is more convenient for installation.

Optionally, the turnover portion of the insulation layer 242 may be fixedly connected to the third face 2113 of the battery cell group 201, so as to achieve the fixing between the turnover portion and the battery cell group 201. For example, as shown in FIG. 6, the edge of the turnover portion of the insulation layer 242 may be provided with a folded edge region 2421, and is fixedly connected to the third face 2113 by means of the folded edge region 2421, so as to achieve the fixing between the turnover portion of the insulation layer 242 and the battery cell group 201. For example, the folded edge region 2421 may be bonded and fixed to the third face 2113 by a binder.

Optionally, as shown in FIG. 8, the insulation layer 242 and the second face 2112 form, at the turnover position, an angle region 2422 facing cooling system 30, the angle region 2422 being configured to collect a binder for bonding the cooling system 30. In this way, when the cooling system 30 is fixed to the first face 2111 by means of bonding with a binder, the angle region 2422 can serve as a binder overflow region, and can be used to collect excess binder that overflows, so as to prevent the binder from affecting the other components in the battery 10.

It should be understood that, for any covering member 25 mentioned above, the covering member 25 may be provided within the coverage range of the cooling system 30. Specifically, as shown in FIGS. 5 to 8, the projection of the cooling system 30 in the first direction X can completely cover the projection of the covering member 25, so that the covering member 25 does not affect the installation of the cooling system 30, and the condensed liquid generated by the cooling system 30 can be better kept out by the covering member 25.

Optionally, the end of the cooling system 30 close to the covering member 25 in the embodiment of the present application may be provided obliquely toward the covering member 25. Specifically, as shown in FIGS. 5 to 8, the end of the cooling system 30 that is close to the covering member 25 can be provided with an inclined section 31, and the inclined section 31 is inclined toward the covering member 25, so that the condensed liquid generated on the surface of the cooling system 30 can slide down through the inclined section 31, which can prevent the condensed liquid from accumulating on the surface of the cooling system 30 and not being discharged, and the inclined section 31 extends in a direction away from the signal transmission assembly 24, which can also prevent dripping of a large amount of condensed liquid near the signal transmission assembly 24, thereby improving the safety of the signal transmission assembly 24.

Therefore, the battery 10 in the embodiment of the present application is provided with the cooling system 30 on the first face 2111, and is provided with the signal transmission assembly 24 on the second face 2112 adjacent to the first face 2111, so as to achieve electrical connection between the plurality of battery cells 20. In addition, the battery 10 further comprises a covering member 25 for covering the signal transmission assembly 24, so that when the cooling system 30 generates condensed liquid, the covering member 25 can prevent the condensed liquid from reaching the signal transmission assembly 24 so as to prevent short-circuiting of the battery 10, thereby improving the safety of the battery 10.

An embodiment of the present application further provides a power consuming apparatus that may comprise the battery 10 according to the foregoing embodiments for supplying electric energy to the power consuming apparatus. Optionally, the power consuming apparatus may be a vehicle 1, a ship or a spacecraft.

The battery and the power consuming apparatus according to the embodiments of the present application are described above, and a method and apparatus for manufacturing a battery according to the embodiments of the present application will be described below. For the parts not described in detail, reference can be made to the foregoing embodiments.

Figure 9:
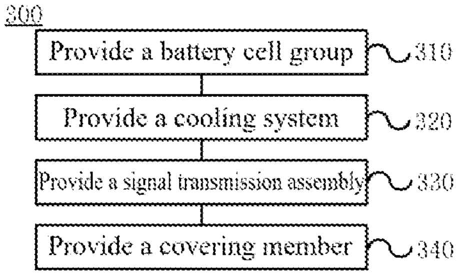
FIG. 9 is a schematic flow diagram of a method for manufacturing a battery disclosed in an embodiment of the present application.

FIG. 9 shows a schematic flow diagram of a method 300 for manufacturing a battery according to an embodiment of the present application. As shown in FIG. 9, the method 300 may comprise: 310, providing a battery cell group 201, the battery cell group 201 comprising a plurality of battery cells 20; 320, providing a cooling system 30, the cooling system 30 being provided on a first face 2111 of the battery cell group 201; 330, providing a signal transmission assembly 24, the signal transmission assembly 24 being provided on a second face 2112 of the battery cell group 201, the second face 2112 being adjacent to the first face 2111, the signal transmission assembly 24 comprising a busbar component 241 and an insulation layer 242, the insulation layer 242 being used to enclose the busbar component 241, the insulation layer 242 having holes, and the busbar component 241 being configured to be electrically connected to the battery cells 20 in the battery cell group 201 at the holes; and 340, providing a covering member 25, the covering member 25 being used to cover the signal transmission assembly 24 to prevent condensed liquid generated by the cooling system 30 from reaching the signal transmission assembly 24.

Figure 10:
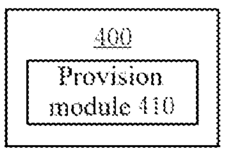
FIG. 10 is a schematic block diagram of an apparatus for manufacturing a battery disclosed in an embodiment of the present application.

FIG. 10 shows a schematic block diagram of an apparatus 400 for manufacturing a battery according to an embodiment of the present application. As shown in FIG. 10, the apparatus 400 for manufacturing a battery may comprise a provision module 410. The provision module 410 is used for: providing a battery cell group 201, the battery cell group 201 comprising a plurality of battery cells 20; providing a cooling system 30, the cooling system 30 being provided on a first face 2111 of the battery cell group 201; providing a signal transmission assembly 24, the signal transmission assembly 24 being provided on a second face 2112 of the battery cell group 201, the second face 2112 being adjacent to the first face 2111, the signal transmission assembly 24 comprising a busbar component 241 and an insulation layer 242, the insulation layer 242 being used to enclose the busbar component 241, the insulation layer 242 having holes, and the busbar component 241 being configured to be electrically connected to the battery cells 20 in the battery cell group 201 at the holes; and providing a covering member 25, the covering member 25 being used to cover the signal transmission assembly 24 to prevent condensed liquid generated by the cooling system 30 from reaching the signal transmission assembly 24.

While the present application has been described with reference to the preferred embodiments, various modifications can be made, and equivalents can be provided to substitute for the components thereof without departing from the scope of the present application. In particular, the technical features mentioned in the embodiments can be combined in any manner, as long as there is no structural conflict. The present application is not limited to the specific embodiments disclosed herein, but includes all the technical solutions that fall within the scope of the claims.

What is claimed is:

1. A battery, comprising:

a battery cell group comprising a plurality of battery cells;

a cooling system provided on a first face of the battery cell group;

a signal transmission assembly provided on a second face of the battery cell group, the second face being adjacent to the first face, the signal transmission assembly comprising a busbar component and an insulation layer, the insulation layer being used to enclose the busbar component, the insulation layer having holes, and the busbar component being configured to be electrically connected to the battery cells in the battery cell group at the holes; and a covering member for covering the signal transmission assembly to prevent condensed liquid generated by the cooling system from reaching the signal transmission assembly, wherein the insulation layer extends toward the cooling system and is turned over in a direction away from the cooling system to form the covering member.

2. The battery according to claim 1, wherein a turnover portion of the insulation layer is fixedly connected to a third face of the battery cell group, the third face being parallel to the first face.

3. The battery according to claim 2, wherein an edge of the turnover portion of the insulation layer is provided with a folded edge region, the folded edge region being configured to be fixedly connected to the third face.

4. The battery according to claim 1, wherein the insulation layer and the second face form an angle region facing the cooling system, the angle region being configured to collect a binder for bonding the cooling system.

5. The battery according to claim 1, wherein the covering member is a cover plate that covers the second face.

6. The battery according to claim 5, wherein the cover plate comprises a first connecting region configured to be fixedly connected to the first face.

7. The battery according to claim 6, wherein the cover plate further comprises a second connecting region configured to be fixedly connected to a third face of the battery cell group, the third face being parallel to the first face.

8. The battery according to claim 5, wherein the cover plate is provided with drain grooves for draining the condensed liquid.

9. The battery according to claim 8, wherein the cover plate is further provided with a confluence groove, the confluence groove being in communication with the drain groove, and the confluence groove being used to collect the condensed liquid and introduce the condensed liquid into the drain groove.

10. The battery according to claim 5, wherein the cover plate is made of an insulation material.

11. The battery according to claim 1, wherein the battery cell group comprises N battery cell rows arranged in a first direction, and the battery cells in each battery cell row in the N battery cell rows are arranged in a second direction, the first direction being perpendicular to the second direction, and N being a positive integer, wherein the first face is perpendicular to the first direction, and the second face is parallel to a plane determined by the first direction and the second direction.

12. The battery according to claim 1, wherein a projection of the cooling system in the first direction covers a projection of the covering member, and the first face is perpendicular to the first direction.

13. The battery according to claim 1, wherein an end of the cooling system close to the covering member is provided obliquely toward the covering member.

14. A power consuming apparatus, comprising a battery according to claim 1 for supplying electric energy.

15. A method for manufacturing a battery, the method comprising:

providing a battery cell group, the battery cell group comprising a plurality of battery cells;

providing a cooling system, the cooling system being provided on a first face of the battery cell group;

providing a signal transmission assembly, the signal transmission assembly being provided on a second face of the battery cell group, the second face being adjacent to the first face, the signal transmission assembly comprising a busbar component and an insulation layer, the insulation layer being used to enclose the busbar component, the insulation layer having holes, and the busbar component being configured to be electrically connected to the battery cells in the battery cell group at the holes; and providing a covering member, the covering member being used to cover the signal transmission assembly to prevent condensed liquid generated by the cooling system from reaching the signal transmission assembly, wherein the insulation layer extends toward the cooling system and is turned over in a direction away from the cooling system to form the covering member.

16. An apparatus for manufacturing a battery, the apparatus comprising a provision module used for:

providing a battery cell group, the battery cell group comprising a plurality of battery cells;

providing a cooling system, the cooling system being provided on a first face of the battery cell group;

providing a signal transmission assembly, the signal transmission assembly being provided on a second face of the battery cell group, the second face being adjacent to the first face, the signal transmission assembly comprising a busbar component and an insulation layer, the insulation layer being used to enclose the busbar component, the insulation layer having holes, and the busbar component being configured to be electrically connected to the battery cells in the battery cell group at the holes; and providing a covering member, the covering member being used to cover the signal transmission assembly to prevent condensed liquid generated by the cooling system from reaching the signal transmission assembly, wherein the insulation layer extends toward the cooling system and is turned over in a direction away from the cooling system to form the covering member.

* * * * *